Patented Sept. 2, 1952

2,609,303

UNITED STATES PATENT OFFICE 2,609,303

COMPOSITION OF MATTER FOR MAKING ARTIFICIAL LUMBER

George M. Harris, Macon, Ga., assignor of one-half to Harold A. Cook, Atlanta, Ga.

No Drawing. Application January 21, 1948, Serial No. 3,566

2 Claims. (Cl. 106—163)

This invention relates to a new composition of matter which may be utilized for forming a sheet, slab, board, block or other article from sawdust, or wood fibre or any comminuted vegetable fibrous material or combination of such materials mixed with a particular binding material and compressed as desired.

The invention contemplates a lumber, board, tile or other construction material substitute made from wood waste, sawdust or wood shavings and other fibrous materials in combination with a binder composed of formaldehyde, sulphuric acid and starch.

Other objects and advantages are to provide a composition of matter that will be superior in point of simplicity, inexpensiveness, facility, convenience, appearance and general efficiency.

Still other and further objects and advantages of my invention will be apparent from the following description.

According to my invention, twelve parts of 40 per cent formaldehyde solution are added to from one to two parts of sulphuric acid. The above ingredients are thoroughly mixed or blended in a masticating or kneading and mixing machine with sixteen parts of starch, and then 128 parts of sawdust, or other fibrous material, is added and the whole is thoroughly kneaded or mixed together. The composition is then pressed or molded to the desired thickness and shape and allowed to dry. Drying or curing may take place in the open air within a period of twenty-four hours, or, if desired, a small amount of heat can be applied to speed the drying process.

The product is water repellent, fire resistant, durable and sufficiently tough, as well as hard, so that the edges will not break off, and it may be sawed, nailed and otherwise worked upon with the usual carpenter or wood tools.

The product is made more transparent by the use of up to two parts of acid in the binder and may be said to have a more pleasing appearance. Also, coloring matter may be added to the fibre before mixing with the binder, and thus vary the attractive appearance of the product. Moreover, the composition may be cured under water and this also results in a more transparent product in which the fibrous material is more apparent.

The addition of a small amount, such as $\tfrac{1}{10}$ part, of a drying oil, such as linseed or tung, in the binder will give a more glazed finish to the compressed product, and this may be desirable where it is to be used on tables or counters or as a tile substitute. The addition of a small amount, such as $\tfrac{1}{10}$ part, of a non-drying oil, such as castor oil, will improve the flexibility of the product, where such characteristic may be desirable.

The composition, as well as the method of making the same, may also include other forms or embodiments than those specifically referred to herein, and the exact composition and process may be varied slightly and still remain within the scope of my invention as defined in the following claims.

I claim:

1. Composition of matter comprising approximately 128 parts of comminuted wood mixed with a binder having the proportions of approximately 12 parts of 40% formaldehyde solution, 1 to 2 parts of sulphuric acid and 16 parts of starch.

2. Composition of matter comprising approximately 128 parts of sawdust mixed with a binder including approximately 12 parts of 40% formaldehyde solution, from 1 to 2 parts of sulphuric acid and approximately 16 parts of starch.

GEORGE M. HARRIS.

REFERENCES CITED

The following references are of record in the file of this patent:

UNITED STATES PATENTS

| Number | Name | Date |
|---|---|---|
| 2,113,034 | Rowland | Apr. 5, 1938 |
| 2,222,872 | Leuck | Nov. 26, 1940 |
| 2,230,656 | Scholler | Feb. 4, 1941 |
| 2,306,120 | Gugger | Dec. 22, 1942 |

FOREIGN PATENTS

| Number | Country | Date |
|---|---|---|
| 647,191 | Germany | Feb. 1, 1938 |